United States Patent [19]
Rosenhauer et al.

[11] Patent Number: 5,838,911
[45] Date of Patent: Nov. 17, 1998

[54] METHOD AND APPARATUS FOR OBTAINING NETWORK INFORMATION BY USING A DYNAMIC LINK LIBRARY

[75] Inventors: Alan Rosenhauer, Franklin; Paul S. Pruett, Columbia; Joel R. Jensen, Franklin, all of Tenn.

[73] Assignee: Electronic Data Systems Corporation, Plano, Tex.

[21] Appl. No.: 652,870

[22] Filed: May 23, 1996

[51] Int. Cl.⁶ .................................................. H04L 9/00
[52] U.S. Cl. ........................ 395/200.33; 395/200.55; 395/200.59
[58] Field of Search ................. 395/200.33, 200.55, 395/200.56, 200.59, 670, 680, 685

[56] References Cited

U.S. PATENT DOCUMENTS

| | | | |
|---|---|---|---|
| 5,375,241 | 12/1994 | Walsh | 395/700 |
| 5,490,256 | 2/1996 | Mooney | 395/375 |
| 5,596,750 | 1/1997 | Li et al. | 395/671 |
| 5,634,114 | 5/1997 | Shipley | 395/500 |
| 5,655,077 | 8/1997 | Jones et al. | 395/187.01 |
| 5,657,390 | 8/1997 | Elgamal et al. | 380/49 |
| 5,666,523 | 9/1997 | D'Souza | 395/570 |

*Primary Examiner*—Eric Coleman
*Assistant Examiner*—Mackly Monestime
*Attorney, Agent, or Firm*—David G. Wille; L. Joy Griebenow

[57] ABSTRACT

A method and system are disclosed for obtaining network information in a computer network. The invention allows application programs to obtain computer network information using programming language independent dynamic link library functions. The method of the invention comprises generating a call to a dynamic link library function from an application program running on a client computer in a computer network. The call requests some information about the computer network and that information is resident on a server computer. A dynamic link library function interprets the call and generates a network application program interface call. After receiving network information in response to the network application program interface call, the dynamic link library function processes the network information and returns the processed information to the application program.

14 Claims, 1 Drawing Sheet

METHOD AND APPARATUS FOR OBTAINING NETWORK INFORMATION BY USING A DYNAMIC LINK LIBRARY

TECHNICAL FIELD OF THE INVENTION

This invention relates generally to computer networks and more particularly to a method and system for obtaining network information in a computer network.

BACKGROUND OF THE INVENTION

In recent years, there has been a large increase in the number of local area networks connecting computers, printers, and other digital devices. A typical local area network includes a number of client computers networked to a server. The server often will contain software or data shared among the client computers.

Because of the sharing of data and software among client computers, software running on a client computer typically needs to obtain information about the structure or other characteristics of the computer network such as a list of all user groups of which a particular user is a member, the particular user privileges granted to a given user group, a list of all currently logged on users, a list of all log-in names for the network, the number of currently logged on users, a list of all user groups, user account information, a list of shared directories, information about a network drive connection, the identification of a particular user, the identification of the computer where a particular user is logged on, a list of all file servers, information about a server, etc. An application running on a client computer typically obtains access to such network information using network application program interface (API) routines. The author of the network operating system normally provides API routines to obtain network information.

Unfortunately, using API routines to obtain network information can be problematic. Application program designers are highly dependent upon operating system designers for these API calls. If a new version of the operating system no longer supports certain API calls, application designers may have to rewrite their applications. Similarly, application rewrites may be necessary if an API routine changes slightly in a later version of the operating system. Also, API routines may be written for a particular version of an operating system and may not run easily on later versions of the operating system. For example, API routines written for a 16 bit operating system may not work properly on a 32-bit operating system.

API routines may also be cumbersome to work with depending upon their sophistication. In particular, API routines may be difficult to call from application programs written in the Basic language. Even when an API call is easy to make, sophisticated processing of the information obtained from the API call may be necessary, leading to an increase in both cost and development time of an application program.

SUMMARY OF THE INVENTION

The invention comprises a method and system for obtaining network information in a computer network. The invention utilizes dynamic link library functions to obtain network information. In accordance with the method of the invention, an application generates a first call to a dynamic link library requesting information about the computer network. The application program is running on a client computer and the network information is stored on a server computer. A dynamic link library function interprets the call and generates at least one network application program interface call from the dynamic link library function. After receiving network information in response to the network application program interface call, the dynamic link library function processes the network information and returns the processed information to the application program.

The invention has several important technical advantages. As new versions of the underlying operating system are developed, application programmers utilizing the invention do not have to rewrite their applications to be compatible with the new operating system. Instead, programmers can simply update the dynamic link libraries to be compatible with the new network API routines available under the new version of the operating system. In terms of obtaining network information, then, the invention allows operating system upgrades to be transparent to application program designers.

The invention allows application program designers to obtain the required network information in an efficient way without having to develop complicated routines for processing network information. The invention also makes available a common library of functions to application programs written in a variety of different languages. By making use of a dynamic link library, programmers need not develop code to perform similar or identical functions in a variety of programming languages.

BRIEF DESCRIPTION OF THE DRAWINGS

For a more complete understanding of the present invention and the advantages thereof, reference is now made to the following descriptions taken in conjunction with the accompanying drawings in which.

DETAILED DESCRIPTION OF THE INVENTION

Figure 1:
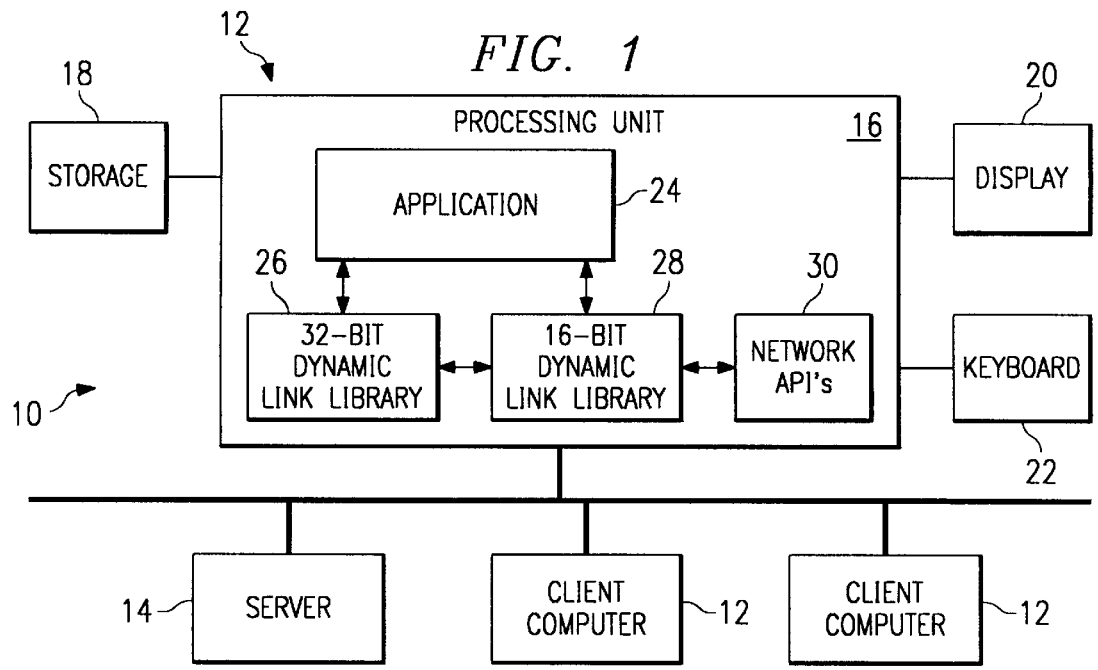
FIG. 1 illustrates a system constructed in accordance with the invention for obtaining network information in a client/server computer network.
Figure 2:
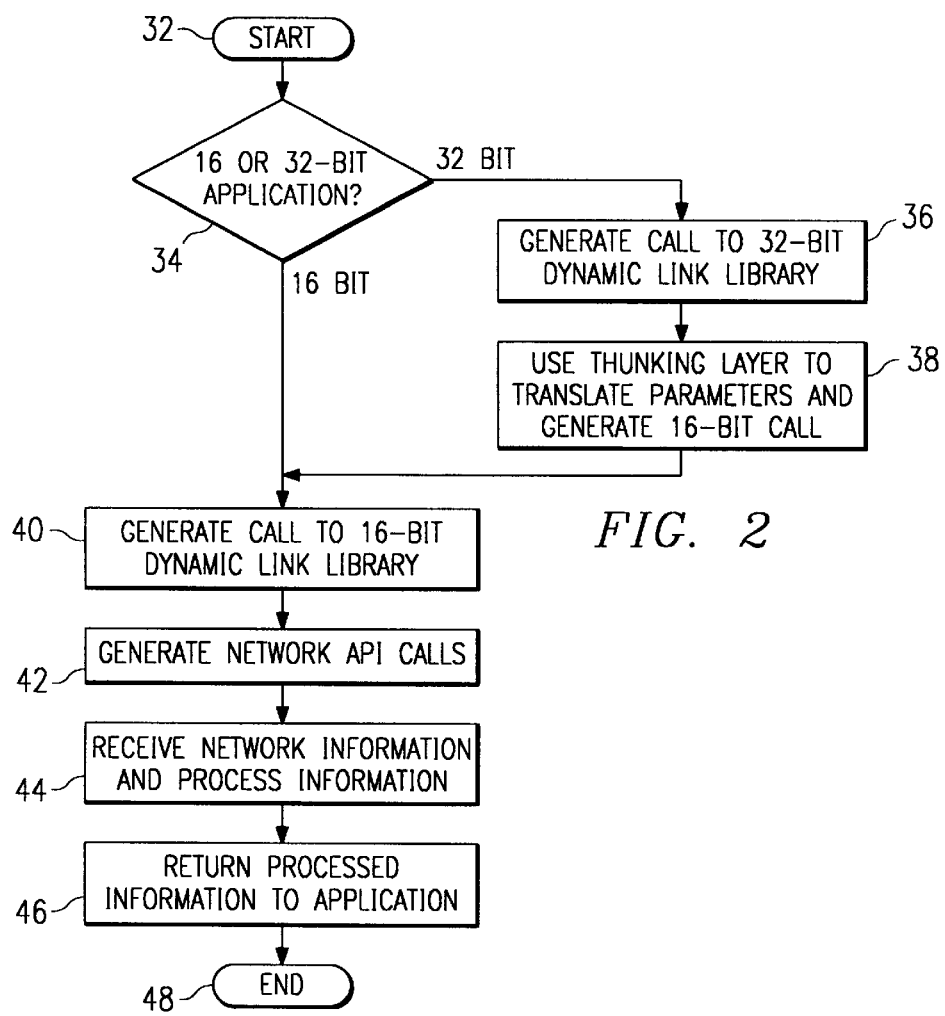
FIG. 2 illustrates a flow chart of the operation of an embodiment of the invention.

The preferred embodiment of the present invention and its advantages are best understood by referring to FIGS. 1 and 2 of the drawings, like numerals being used for like and corresponding parts of the various drawings.

FIG. 1 illustrates a communication system for obtaining network information in computer network 10. Computer network 10 comprises one or more client computers 12 connected to one or more servers 14. Computer network 10 may also include other types of devices such as modems, fax machines, printers, frame relay devices, etc.

Client computer 12 may be any type of general purpose computer. In this embodiment, client computer 12 comprises processing unit 16, storage 18, display 20, and keyboard 22. One or more of these components could be omitted from client computer 12 and other components could be added. Processing unit 16 is connected to each of the remaining elements. Display 20 can be used to output data from client computer 12. Client computer 12 can receive input from a user through keyboard 22. Client computer 12 may communicate with other devices in computer network 10 using a network interface (not explicitly shown). Data and software used by client computer 12 may be stored in memory (not explicitly shown) contained in processing unit 16 or in storage 18. Storage 18 may include a hard disk drive, floppy disk drive, magnetic tape drive, optical storage, and/or any other type of computer storage device. Client computer 12 will normally be a personal computer such as a personal computer running the Microsoft DOS™ or Microsoft Windows™ operating systems. Client computer 12 may also be any other type of personal computer, microcomputer, computer workstation, terminal, etc. Similarly, servers 14 may be any type of general purpose computer.

As illustrated in FIG. 1, computer network 10 is executing an application program 24. Application program 24 obtains network information by making calls to routines in 32-bit dynamic link library 26 or 16-bit dynamic link library 28. 32-bit dynamic link library 26 processes requests from application program 24 and translates those requests into proper requests to 16-bit dynamic link library 28. 16-bit dynamic link library 28 obtains network information through network APIs 30. Network APIs 30 comprise a series of application program interface routines that can be called to obtain network information. Application 24, 32-bit dynamic link library 26, 16-bit dynamic link library 28, and network APIs 30 are stored in the physical or virtual memory of processing unit 16 while they are executing or otherwise in use. This software may also be permanently stored on storage 18.

Dynamic link libraries 26 and 28 allow client computer 12 to obtain various information about the structure or users of computer network 10. Examples of information that could be obtained include a list of all user groups of which a particular user is a member, a list of all user groups, user account information, a list of shared directories, information about a network drive connection, the privileges given to a particular user group, the privileges given to a particular user, a list of all currently logged-on users, a list of all users, the number of currently logged-on users, the identification of a particular user, a list of all file servers, and information about a server. Other information could also be obtained using dynamic link libraries 26 and 28 without departing from the scope and teachings of the present invention.

Application program 24 obtains the network information by making a call to one of the dynamic link libraries 26 or 28. Application program 24 is preferably either a 16-bit or 32-bit application in this embodiment. As microprocessors evolve, they become capable of handling increasingly larger instruction words. However, computer manufacturers strive to maintain compatibility of a new microprocessor with software written for a prior version of that microprocessor. Thus, in this embodiment, dynamic link libraries 26 and 28 allow either 16-bit or 32-bit applications to make similar procedure calls to obtain the same network information.

If application 24 is a 16-bit application, it generates a call to a dynamic link library function in 16-bit dynamic link library 28. Dynamic link library 28 then interprets the function call from application 24 and generates at least one network API call using network APIs 30. Some dynamic link library functions supported by 16-bit dynamic link library 28 may require more than one network API call to obtain the requested information. After receiving the network information in response to the network API call from one of the network APIs 30, the function in 16-bit dynamic link library 28 processes the network information and returns the processed information to application program 24.

In the case where application program 24 is a 32-bit application, application program 24 obtains network information by making a call to 32-bit dynamic link library 26. In this embodiment, the called 32-bit function in 32-bit dynamic link library 26 causes the parameters to be translated into their appropriate 16-bit parameters and generates a call to the corresponding 16-bit function in 16-bit dynamic link library 28. In this embodiment, 32-bit dynamic link library 26 is running on a computer controlled by a version of the Microsoft Windows™ operating system. 32-bit dynamic link library 26 makes use of the thunking layer available in the Microsoft Windows '95™ operating system to translate the 32-bit parameters to the appropriate parameters for a call to a function in 16-bit dynamic link library 28. Alternatively, 32-bit dynamic link library 26 could be written to make direct calls to 32-bit network APIs (not explicitly shown). In this embodiment, 32-bit dynamic link library 26 does makes such calls in some cases.

After proper translation using the thunking layer, the 32-bit dynamic link library function called by application program 24 generates a call to the corresponding function in 16-bit dynamic link library 28. In response, the 16-bit function generates a network API call using one of the network APIs 30. As before, the function in 16-bit dynamic link library 28 may generate multiple network API calls using network APIs 30. After receiving the network information from the appropriate network API 30, the function in 16-bit dynamic link library 28 processes the information and returns the processed information to the calling function in 32-bit dynamic link library 26. Then, the 32-bit function processes the network information and returns the processed information to application program 24. Alternatively, 32-bit dynamic link library 26 may simply pass the information received from 16-bit dynamic link library 28 back to application program 24 after proper translation using the Windows '95™ thunking layer.

FIG. 2 illustrates a flow chart that further describes the operation of an embodiment of the invention. The process starts at step 32. At decision box 34, application program 24 can generate a call to either 32-bit dynamic link library 26 or 16-bit dynamic link library 28 depending upon whether application program 24 is a 16 or 32-bit application. If application program 24 is a 32-bit application, it calls a function in 32-bit dynamic link library 26 in step 36. Then, in step 38, 32-bit dynamic link library 26 uses the thunking layer of the Windows '95™ operating system to translate the parameters and generate a call to the corresponding function in 16-bit dynamic link library 28. This call takes place in step 40. If application program 24 is a 16-bit application, it executes step 40 and bypasses steps 36 and 38.

In step 42, the 16-bit function generates one or more network API calls to obtain the appropriate network information. The 16-bit function in 16-bit dynamic link library 28 then, at step 44, receives and processes the information obtained from the network API calls. Next, in step 46, the processed information is returned to application program 24. In the case of a 16-bit function call, the called function in 16-bit dynamic link library 28 returns the processed information directly to application program 24. In the case of a 32-bit function call, the function in 16-bit dynamic link library 28 returns the processed information to the appropriate calling function in 32-bit dynamic link library 26 which, in turn, returns the processed information to application program 24. In the case of a 32-bit function call, the information may be translated from 16-bit form to 32-bit form using the thunking layer available in the Microsoft Windows '95™ operating system. For purposes of this application, the term, "processing" has a broad meaning and may include any type of processing including simply passing all of the received information back to application program 24.

Although the present invention has been described in detail, it should be understood that various changes, substitutions, and alterations can be made hereto without departing from the spirit and scope of the invention as defined by the appended claims.

What is claimed is:

1. A computer network information communication system, comprising:

a client computer running an application program, the application program operable to generate a first call requesting information about the computer network, that information resident on a server computer;

a first dynamic link library function operable to receive and interpret the first call and to generate, from the first call, a second call;

a second dynamic link library function operable to receive the second call, and generate from the second call at least one network application program interface call identifying the requested network information, the second dynamic link library function further operable to receive the requested network information from the server computer in response to the network application program interface call, process the requested network information, and return the processed network information to the first dynamic link library function;

the first dynamic link library function further operable to return the processed network information to the application program; and wherein the first and second dynamic link library functions reside on the same computer.

2. The computer network information communication system of claim 1, wherein the computer network is operating under a version of the Microsoft Windows™ operating system.

3. The computer network information communication system of claim 1, wherein the requested network information is selected from a group consisting of a list of all user groups of which a particular user is a member, the list of all currently logged on users, the number of currently logged on users, the identification of a particular user, a list of all user groups, user account information, a list of shared directories, information about a network drive connection, a list of all file servers, and information about a server.

4. The computer network information communication system of claim 1, wherein the dynamic link library function resides in the memory of the client computer.

5. A method for obtaining network information in a computer network, comprising:

generating a first call to a first dynamic link library function from an application program running on a client computer, wherein the first call requests information about the computer network, that information resident on a server computer;

interpreting the first call using the first dynamic link library function;

generating, from the first call, a second call to a second dynamic link library function, wherein the first and second dynamic link library functions reside on the same computer;

generating, from the second call, at least one network application program interface call identifying the requested network information;

receiving the requested network information in response to the network application program interface call;

processing the requested network information using the second dynamic link library function;

returning the processed, requested network information to the first dynamic link library function; and returning the processed, requested network information from the first dynamic link library function to the application program.

6. The method of claim 5 wherein the application program is a 32-bit application, the first dynamic link library function is a 32-bit function, and the second dynamic link library function is a 16-bit function.

7. The method of claim 6, further comprising:

translating a 32-bit parameter into a 16-bit parameter prior to generating the second call.

8. The method of claim 7, further comprising:

translating the processed, requested network information into 32-bit values prior to returning the processed, requested network information from the first dynamic link library function to the application program.

9. The method of claim 5, wherein the computer network is operating under a version of the Microsoft Windows™ operating system.

10. The method of claim 5, wherein the requested network information is selected from a group consisting of a list of all user groups of which a particular user is a member, the list of all currently logged on users, the number of currently logged on users, the identification of a particular user, the password of a particular user, a list of all file servers, and the location of a print server.

11. The method of claim 5, wherein the first dynamic link library function and second dynamic link library function reside in the memory of the client computer.

12. The system of claim 1 wherein the application program is a 32-bit application, the first dynamic link library function is a 32-bit function, and the second dynamic link library function is a 16-bit function.

13. The computer network information communication system of claim 12 wherein the first dynamic link library is further operable to translate a 32-bit parameter into a 16-bit parameter prior to generating the second call.

14. The system of claim 13 wherein the first dynamic link library function is further operable to translate the processed, requested network information into 32-bit values prior to returning the processed, requested network from the first dynamic link library function to the application program.

* * * * *